Patented Jan. 8, 1946

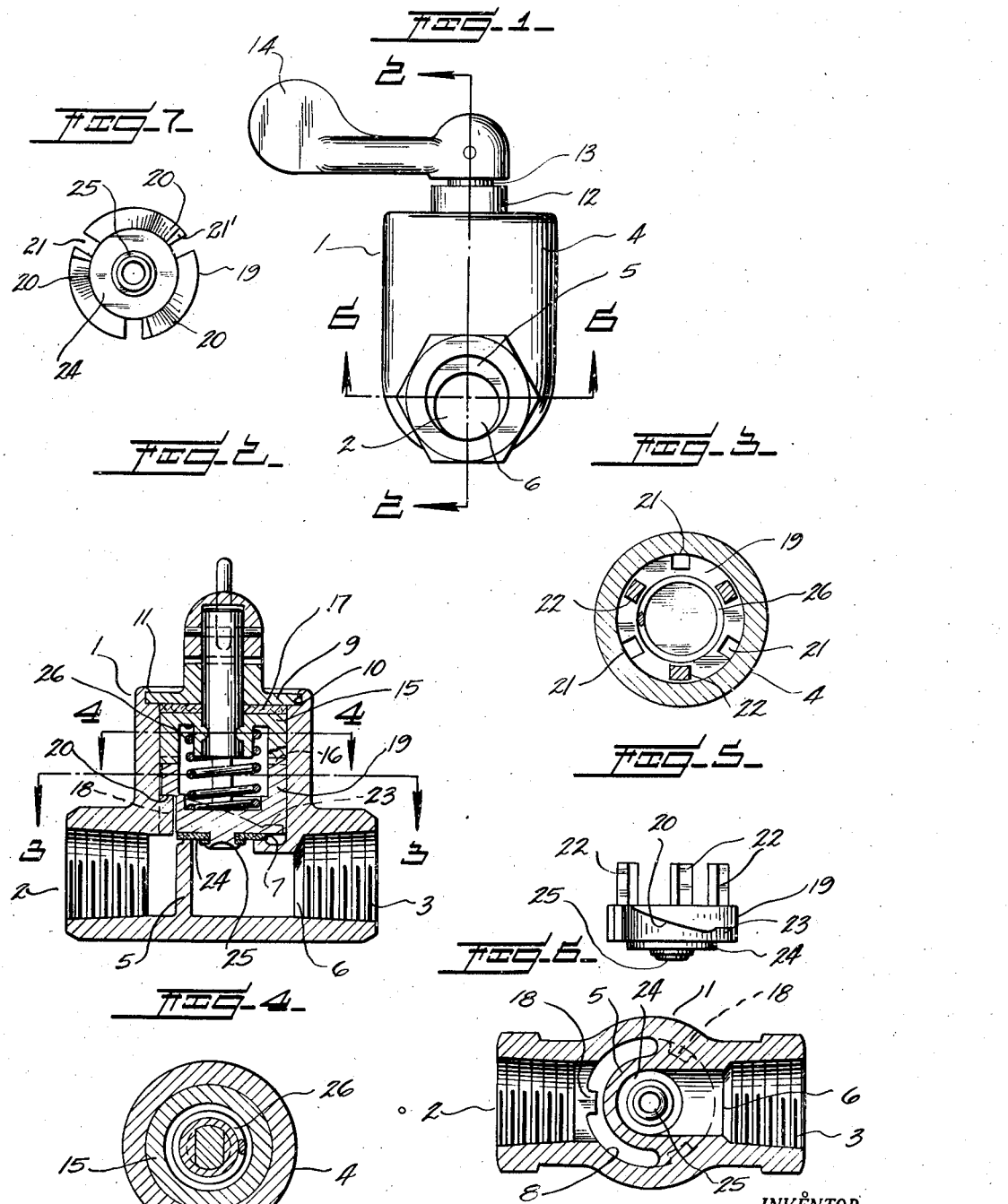

2,392,800

UNITED STATES PATENT OFFICE 2,392,800

VALVE

Howard W. Osburn, Detroit, Mich., assignor to Power Brake Parts Manufacturing and Sales Company, Detroit, Mich., a corporation of Michigan Application January 5, 1944, Serial No. 517,128

7 Claims. (Cl. 251—132)

The present invention pertains to a novel valve designed particularly, but not exclusively, for use in a suction line. An example of such a use is a line extending from the intake manifold of the engine of a tractor and adapted for connection to the braking system of a trailer.

One of the objects of the invention is to provide a valve having a plug formed with a series of cams, whereby the plug, by rotation, is lifted fully and freely from the valve seat. Moreover, in this connection, the plug is moved from one extreme position to the other by a relatively short rotation of the valve handle, on the order of 90°.

Another object of the invention is to provide a valve having positive retaining means for the plug in either open or closed position. This means comprises seats formed in the plug in association with the cams and adapted to receive the body parts on which the cams ride. The retaining force is provided by a spring acting on the plug and is such as to be overcome by manual operating effort, yet is sufficient to hold the plug from turning under vibration.

Still another object is to provide a valve that is self-compensating and self-alining with respect to the valve seat and the seating washer, even when such wear is irregular. This object is accomplished by a peculiar connection of the valve plug to its actuating member, such that the aforementioned spring acting on the plug causes the plug to take a tilted position, if necessary, in response to uneven wear.

The general construction of the valve is simple, compact and durable and is relatively inexpensive inasmuch as all its major parts may be die-cast with the exception of the valve stem or rod.

The invention is disclosed in an illustrative embodiment in the following description and in the accompanying drawing, in which Figure 1 is an end view of the valve;

Figure 2 is a vertical section on the line 2—2 of Figure 1;

Figure 3 is a section on the line 3—3 of Figure 2;

Figure 4 is a section on the line 4—4 of Figure 2;

Figure 5 is an elevation of the cam plug;

Figure 6 is a section on the line 6—6 of Figure 1, and

Figure 7 is a bottom plan view of the cam plug.

In Figure 1 is shown a valve body 1 having an inlet 2 and an outlet 3 in alinement and formed between them with a boss 4 for containing internal parts as will presently appear. An abutment 5 is formed in the body as an obstruction between the inlet and the outlet. In the obstruction is formed a passage 6 communicating with the outlet, and around one end of the passage is formed a valve seat 7. Adjacent to the valve seat, an arcuate slot 8 extending about 180° is cut in the body 1 adjacent to the obstruction 5 and in communication with the inlet 2 and in communication with the seat 7 over the top of the obstruction.

A cap 9 is seated in a groove 10 formed in the upper end of the boss 4, and this end is peened over at 11 to secure the cap. The cap is formed with an outward boss 12 in which is mounted a valve stem 13. A handle 14 is attached to the exposed end of the stem 13 and extends outwardly therefrom.

Within the valve body the stem 13 has molded thereon at 14′ a valve actuator and guide 15 rotatably fitted in the body and formed with a plurality of lengthwise slots 16. A washer 17 mounted upon the actuator 15 fits around the valve stem and prevents leakage in this area.

The valve body is formed with a series of lugs 18, preferably three, extending inwardly and disposed around the valve seat 7. Within the circle of the lugs is mounted a valve plug 19 formed on its lateral wall with a series of shoulder cams 20 spaced apart at 21 a distance equal to the thickness of the lugs 18. The cams are therefore equal in number to the lugs, and it may be seen in Figure 2 that they ride upon the lugs. The high ends of the cams are in one given plane and the low ends in another given plane, so that the cams operate in unison rather than progressively. Fingers 22 extend upwardly from the plug 19 and are slidably received in the slots 16.

At its low end each cam forms a flat face or stop 21′ at one side of the corresponding space 21. The high end of the next cam forms the other end of the same space. At the low end of each cam is formed an upward indentation or seat 23 for a purpose that will presently be described.

To the bottom of the plug 19 is fastened a gasket 24 held by a rivet 25, and adapted to cover the valve seat 7 in the lower position of the plug, as shown in Figure 2. A spring 26 is inserted between the plug 19 and the actuator 15 to hold the cams firmly upon the lugs 18 and also to maintain the actuator permanently in an upward position, thereby compressing the washer 17 and sealing it around the stem 14. It will be apparent that the plug with its washer is the first member to be assembled within the body, followed by the spring, the actuator 15 and the remaining parts.

In the operation of the device, the position of the plug 19 with respect to the seat 7 is determined by the position of the cams 20 on the lugs 18. Rotation of the actuator 15 by means of the valve stem 13 and handle 14 causes the cams to ride on the lugs, thereby altering the elevation of the plug as the fingers 22 slide in the slots 16.

In the raised or open position of the valve plug, the indentations 23 receive the upper ends of the lugs 18. A positive lock, resistant to vibration, is thereby provided, although it can be released by manual force on the handle 14. The closed position is determined by the abutment of the faces 21' against one side of each lug, with the lugs extending slightly into the spaces 21, and is maintained by the spring 26. In this position the fingers 22 extend only a slight distance into the slots 16 and are permitted a small degree of lateral play. Likewise the lugs 18 are slightly loose between the cams, with the result that the plug 19 is permitted to cock or tilt under the action of the spring 26 if necessitated by an unevenly worn valve seat or washer in order to close the seat 7 completely.

The device is intended for use especially in a suction line, for example, one that extends from the motor of a tractor to the brakes of a trailer. In such case the outlet 3 is connected to the low pressure side of the system. When the valve is closed, the chamber within the boss 4 is at atmospheric pressure while the lower surface of the washer 24 is exposed to the reduced pressure in the outlet 3. The pressure differential supplements the spring 26 in holding the valve closed.

The angular distance from one end of each cam to the other end is preferably 90° so that the valve plug is moved from open to closed position, or vice versa by a quarter turn of the handle 14. The spaces 21 therefore have an angular extent of 30° each.

With the exception of the stem 14, spring 26 and washers, all parts of the valve are die-cast, thus requiring no machining. The stem, although preferably of brass, is also an inexpensive part. In general, the construction of the valve is simple and inexpensive and the operation is fast and easy.

Although a specific embodiment of the invention has been shown and described in detail it will be understood that alterations in the details of construction may be made without departure from the scope of the invention as expressed in the annexed claims.

What I claim is:

1. A valve comprising a body formed with an inlet and an outlet and having a laterally extending boss, a valve seat formed between said inlet and said outlet, said body having passages communicating respectively with opposite sides of said valve seat, a plurality of relatively narrow lugs extending inwardly of said body and towards the projected center of said seat, a valve plug rotatably mounted in said boss and adapted to close upon said seat, a plurality of shoulder cams extending from said plug and riding respectively on said lugs, said cams lying at the same elevation axially of said plug, each cam having an indentation in its lower end adapted to receive the upper end of the corresponding lug, a spring bearing upon said plug, and means for rotating said plug, said cams being spaced apart to receive said lugs between adjacent cams in the seated position of said plug.

2. A valve comprising a body formed with an inlet and an outlet and having a laterally extending boss, a valve seat formed between said inlet and said outlet, said body having passages communicating respectively with opposite sides of said valve seat, a plurality of lugs extending inwardly of said body and towards the projected center of said seat, a valve plug rotatably mounted in said boss and adapted to close upon said seat, a plurality of shoulder cams extending from said plug and riding respectively on said lugs, said cams lying at the same elevation axially of said plug, and means for rotating said plug, said plug being relieved between said cams to receive the lugs between adjacent cams in a slightly loose condition when the plug is in closed position, and a spring bearing upon said plug, whereby to compensate for irregularities in the wear of said seat and plug.

3. A valve comprising a body formed with an inlet and an outlet and having a laterally extending boss, a valve seat formed between said inlet and said outlet, said body having passages communicating respectively with opposite sides of said valve seat, a plurality of relatively narrow lugs extending inwardly of said body and towards the projected center of said seat, a valve plug rotatably mounted in said boss and adapted to close upon said seat, a plurality of shoulder cams extending from said plug and riding respectively on said lugs, said cams lying at the same elevation axially of said plug, an actuator rotatably mounted in said boss and having lengthwise slots, fingers extending from said plug and slidably received in said slots, each cam having an indentation in its lower end adapted to receive the upper end of the corresponding lug, and means for rotating said plug.

4. A valve comprising a body formed with an inlet and an outlet and having a laterally extending boss, a valve seat formed between said inlet and said outlet, said body having passages communicating respectively with opposite sides of said valve seat, a plurality of relatively narrow lugs extending inwardly of said body and towards the projected center of said seat, a valve plug rotatably mounted in said boss and adapted to close upon said seat, a plurality of shoulder cams extending from said plug and riding respectively on said lugs, said cams lying at the same elevation axially of said plug, an actuator rotatably mounted in said boss and having lengthwise slots, fingers extending from said plug and slidably received in said slots, each cam having an indentation in its lower end adapted to receive the upper end of the corresponding lug, a spring disposed between said plug and said actuator, and means for rotating said plug.

5. A valve comprising a body formed with an inlet and an outlet and having a laterally extending boss, a valve seat formed between said inlet and said outlet, said body having passages communicating respectively with opposite sides of said valve seat, a plurality of lugs extending inwardly of said body and towards the projected center of said seat, a valve plug rotatably mounted in said boss and adapted to close upon said seat, a plurality of shoulder cams extending from said plug and riding respectively on said lugs, said cams lying at the same elevation axially of said plug, an actuator rotatably mounted in said boss and having lengthwise slots, fingers extending from said plug and slidably received in said slots, each cam having an indentation in its lower end adapted to receive the upper end of the corresponding lug, said cams being spaced apart to receive the lugs between adjacent cams in a slightly loose condition when the plug is in closed position, said fingers having slight lateral play in said slots, and a spring bearing upon said plug, whereby to compensate for irregularities in the wear of said seat and plug.

6. A valve comprising a body formed with an inlet and an outlet and having a laterally extending boss, a valve seat formed between said inlet and said outlet, said body having passages communicating respectively with opposite sides of said body and towards the projected center of said seat, a plurality of lugs extending inwardly of said body and towards the projected center of said seat, a valve plug rotatably mounted in said boss and adapted to close upon said seat, a plurality of shoulder cams extending from said plug and riding respectively on said lugs, said cams lying at the same elevation axially of said plug, an actuator rotatably mounted in said boss and having lengthwise slots, fingers extending from said plug and slidably received in said slots, said boss having a closed top over said actuator, an operating stem rotatably mounted in said top and attached to said actuator, a washer mounted beneath said top and fitted around said stem, and a spring disposed between said plug and actuator, whereby to compress said washer against said top and around said stem.

7. A valve comprising a body formed with an inlet and an outlet and having a laterally extending boss, a valve seat formed between said inlet and said outlet, said body having passages communicating respectively with opposite sides of said valve seat, a plurality of relatively narrow lugs extending inwardly of said body towards the projected center of said seat, a valve plug rotatably mounted in said boss and adapted to close upon said seat, a plurality of shoulder cams extending from said plug and riding respectively on said lugs, said cams lying at the same elevation axially of said plug, an actuator rotatably mounted in said boss and having lengthwise slots, and fingers extending from said plug and slidably received in said slots.

HOWARD W. OSBURN.